(12) United States Patent
Benkreira et al.

(10) Patent No.: US 11,741,516 B2
(45) Date of Patent: Aug. 29, 2023

(54) NON-TRANSITORY COMPUTER-READABLE MEDIUM, METHOD, AND CLIENT DEVICE FOR INSERTING CODE INTO A DOCUMENT OBJECT MODEL OF A GRAPHICAL USER INTERFACE (GUI) FOR UNIFIED PRESENTATION OF DATA

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/949,487

(22) Filed: Oct. 30, 2020

(65) Prior Publication Data

US 2022/0138817 A1 May 5, 2022

(51) Int. Cl.
*G06Q 30/0601* (2023.01)
*G06F 9/451* (2018.01)
(Continued)

(52) U.S. Cl.
CPC ........ *G06Q 30/0609* (2013.01); *G06F 9/451* (2018.02); *G06F 16/986* (2019.01);
(Continued)

(58) Field of Classification Search
CPC .... G06Q 30/06–0645; G06Q 10/0834–08345; G06Q 10/08; G06F 9/451; G06F 16/986
(Continued)

(56) References Cited

U.S. PATENT DOCUMENTS 8,341,529 B1 * 12/2012 Li ..................... G06F 16/95
715/741
10,366,436 B1 * 7/2019 Kumar ................ G06Q 10/087
(Continued)

FOREIGN PATENT DOCUMENTS

GB          2507882 A * 5/2014 ......... G06F 17/2247

OTHER PUBLICATIONS

Rayome, Alison. "Cheap food delivery services: Here's how to compare fees from Uber Eats, Postmates and more" Cnet.com (Year: 2020).*
(Continued)

*Primary Examiner* — Marissa Thein
*Assistant Examiner* — Katherine A Barlow
(74) *Attorney, Agent, or Firm* — Harrity & Harrity, LLP

(57) ABSTRACT

A browser extension may insert code into a document used to generate a web page. For example, the browser extension may detect that the web page is associated with an entity that is associated with one or more delivery estimates. The browser extension may transmit web page information that identifies the entity associated with the web page and/or a date threshold determined based on user input provided to or stored by the browser extension. The browser extension may receive presentation information that identifies a plurality of delivery estimates for a plurality of entities based on transmitting the web page information. The browser extension may insert the code into the document used to generate the web page based on the presentation information. The code may cause an estimated delivery date and/or an indication of whether the date threshold can be satisfied to be provided for display via the web page.

20 Claims, 9 Drawing Sheets

(51) Int. Cl.
  *G06F 16/958* (2019.01)
  *G06Q 10/0834* (2023.01)
(52) U.S. Cl.
  CPC ..... *G06Q 10/0834* (2013.01); *G06Q 30/0623* (2013.01); *G06Q 30/0635* (2013.01); *G06Q 30/0641* (2013.01)
(58) Field of Classification Search
  USPC .............................................. 705/26.1–27.2
  See application file for complete search history.

(56) References Cited

U.S. PATENT DOCUMENTS

| | | | | |
|---|---|---|---|---|
| 2002/0046109 | A1* | 4/2002 | Leonard | G06Q 30/0236 705/14.27 |
| 2008/0288368 | A1* | 11/2008 | Marks | G06Q 30/0641 705/26.81 |
| 2013/0103538 | A1* | 4/2013 | Scholl | G06Q 30/02 705/26.7 |
| 2014/0074658 | A1* | 3/2014 | Sanchez | G06Q 30/0222 705/26.62 |
| 2015/0025995 | A1* | 1/2015 | Yuan | G06Q 30/0631 705/26.7 |
| 2017/0011441 | A1* | 1/2017 | Buezas | G06Q 30/0635 |
| 2018/0181956 | A1* | 6/2018 | Zarakas | G06Q 20/3226 |
| 2019/0026684 | A1* | 1/2019 | Martinez | G06Q 10/083 |
| 2019/0188629 | A1* | 6/2019 | Fujisawa | G06Q 10/08 |
| 2020/0258040 | A1* | 8/2020 | Mueller | G06Q 30/0641 |

OTHER PUBLICATIONS

Deogun, Jitender S. et. al. "Structural Abstractions of Hypertext Documents for Web-based Retrieval" Proceedings Ninth International Workshop on Database and Expert Systems Applications. IEEExplore.ieee.org. doi:10.1109/DEXA.1998.707429 (Year: 2002).*

Kaziukėnas, Juozas. "eBay's Missing Fast Shipping Flywheel" MarketplacePulse.com (Year: 2020).*

Chuan-Hoo Tan, et. al. "Effects of Comparison Shopping Websites on Market Performance: Does Market Structure Matter?" Journal of Electronic Commerce Research, vol. 11, No. 3., pp. 193-219. (Year: 2010).*

Chan et al., "Where2Buy: A Location-Based Shopping App with Products-wise Searching," IEEE 2017 International Symposium on Multimedia (ISM), Dec. 11, 2017, pp. 438-443, XP033291530.

International Search Report and Written Opinion for Application No. PCT/US2021/072076, dated Feb. 3, 2022, 10 pages.

Mehak et al., "Exploiting Filtering Approach with Web Scrapping for Smart Online Shopping : Penny Wise: A Wise Tool for Online Shopping," IEEE 2019 2nd International Conference on Computing, Mathematics and Engineering Technologies (iCoMET), Jan. 30, 2019, pp. 1-5, XP033532329.

Parmanand et al., "A Product Pricing Comparison Model and Data Visualization for Online Retailers," Helsinki Metropolia University of Applied Sciences, Jun. 2, 2019, pp. 1-37, XP055883115, Retrieved from the Internet: [URL: https://www.theseus.fi/bitstream/handle/10024/174175/Parmanand_03_June_Final-1.pdf] [retrieved on Jan. 24, 2022].

* cited by examiner

NON-TRANSITORY COMPUTER-READABLE MEDIUM, METHOD, AND CLIENT DEVICE FOR INSERTING CODE INTO A DOCUMENT OBJECT MODEL OF A GRAPHICAL USER INTERFACE (GUI) FOR UNIFIED PRESENTATION OF DATA

BACKGROUND

A graphical user interface is a form of user interface that allows users to interact with electronic devices. A web browser may provide a graphical user interface that presents web pages. A user may navigate to a web page by entering a web address into an address bar of the web browser and/or by clicking a link displayed via another web page. Navigation to a web page may consume resources of a client device on which the web browser is installed, may consume resources of a web server that serves the web page to the client device, and may consume network resources used for communications between the client device and the web server.

SUMMARY

In some implementations, a non-transitory computer-readable medium stores a set of instructions for modifying a user interface to be provided for presentation by inserting code into a document object model of the user interface. The set of instructions may include one or more instructions that, when executed by one or more processors of a client device, cause the client device to detect that the user interface, to be provided for presentation by the client device, is associated with an entity that is associated with one or more delivery estimates to be provided for presentation; transmit, to a server, user interface information that identifies the entity and a date threshold determined based on user input provided to or stored by the client device; receive, from the server, presentation information that identifies a plurality of delivery estimates for a plurality of entities based on transmitting the user interface information, wherein a delivery estimate, of the plurality of delivery estimates, indicates whether a corresponding entity can satisfy the date threshold, and wherein at least two entities, of the plurality of entities, are associated with different domain names; insert the code into the document object model of the user interface based on the presentation information, wherein the code causes an indication of whether the date threshold can be satisfied, by one or more entities of the plurality of entities, to be provided for presentation via the user interface; and provide the user interface for presentation by the client device based on inserting the code into the document object model.

In some implementations, a method may include inserting code into a document used to generate a web page to be provided for presentation by a client device. The method may include detecting, by a browser extension executing on the client device, that the web page, to be provided for presentation by the client device, is associated with an entity that is associated with one or more delivery estimates to be provided for presentation; transmitting, by the browser extension and to a server, web page information that identifies at least one of: the entity associated with the web page, or a date threshold determined based on user input provided to or stored by the browser extension; receiving, by the browser extension and from the server, presentation information that identifies a plurality of delivery estimates for a plurality of entities based on transmitting the web page information, wherein at least two entities, of the plurality of entities, are associated with different entity platforms; and inserting, by the browser extension, the code into the document used to generate the web page based on the presentation information, wherein the code causes at least one of an estimated delivery date or an indication of whether the date threshold can be satisfied to be provided for display via the web page.

In some implementations, a system includes one or more memories and one or more processors, communicatively coupled to the one or more memories, configured to: receive, from a web browser extension executing on a client device, information that identifies: one or more entities associated with a graphical user interface being presented for display by a web browser executing on the client device, and a date threshold; determine one or more delivery estimates for the one or more entities using a data structure that stores information that identifies an association between entities and delivery estimates; determine whether the one or more delivery estimates satisfy the date threshold; and transmit, to the client device, information that indicates whether the one or more entities are capable of satisfying the date threshold based on determining whether the one or more delivery estimates satisfy the date threshold.

DETAILED DESCRIPTION

Figure 1A:
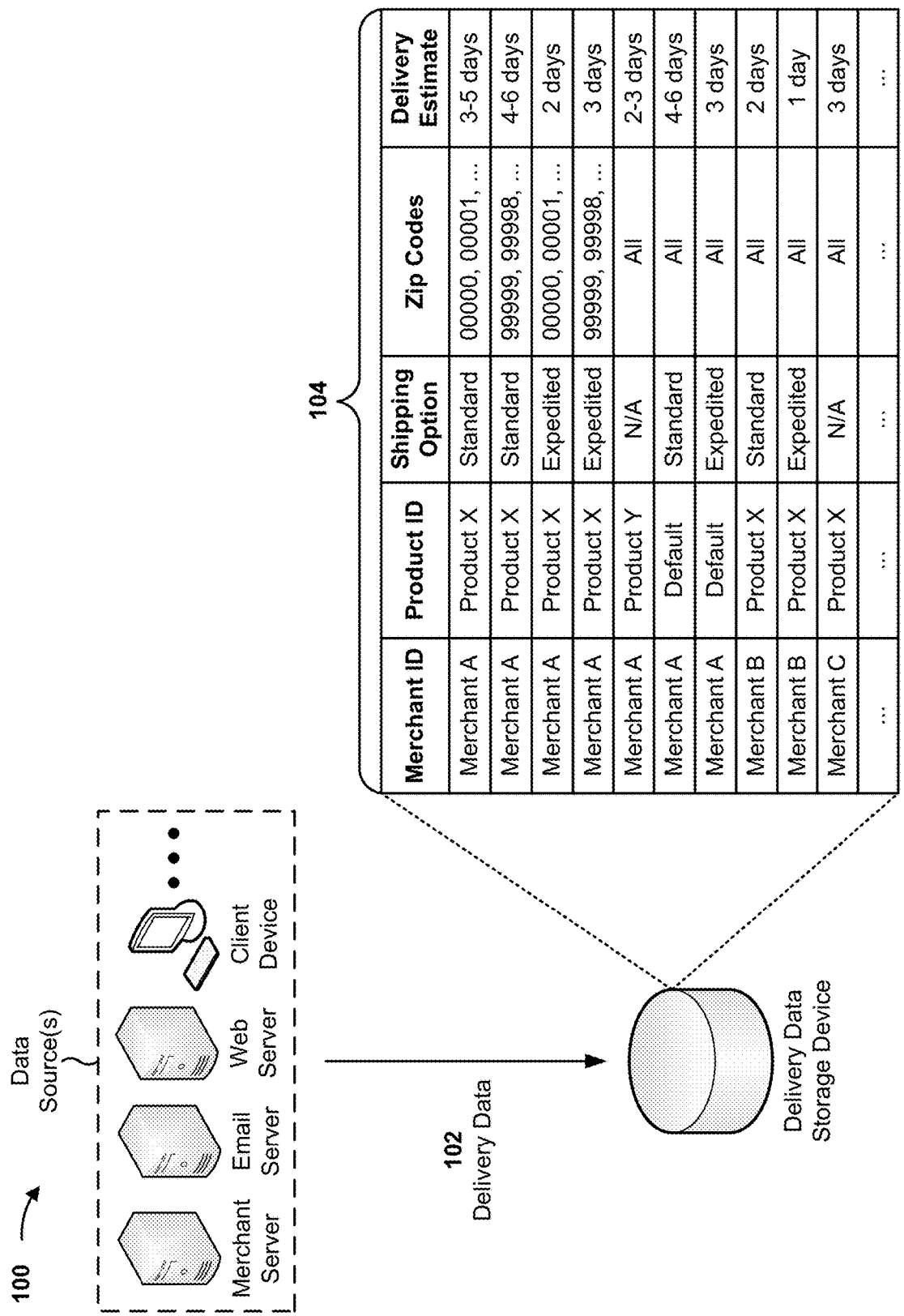
FIGS. 1A-1E are diagrams of an example implementation relating to inserting code into a document object model of a graphical user interface for unified presentation of data.

The following detailed description of example implementations refers to the accompanying drawings. The same reference numbers in different drawings may identify the same or similar elements.

When a user browses web pages or other user interfaces to find information relevant to the user, the user may need to navigate through multiple web pages and/or may need to input some personal information about the user before the user can find the information sought by the user. For example, if the user is trying to determine whether an entity (e.g., a merchant) is capable of delivering an item (e.g., a product) to the user by a specific date, the user may need to navigate multiple web pages to identify the item, select the item, view information about the item, indicate a desire to receive (e.g., purchase) the item, input personal information (e.g., the user's name, address, and payment information), and/or confirm the personal information before a web page is presented to the user that indicates a date (or a range of dates) on which the item is expected to be delivered to the user. If the entity is not capable of delivering the item to the user by the specific date, then the user may need to perform the above process of web page navigation one or more additional times in connection with other entities until the user finds an entity that is capable of delivering the item by the specific date. In some cases, the user may navigate through a large number of web pages for multiple entities only to find that none of the entities is capable of delivering the item by the specific date.

Navigating through a large number of web pages to find relevant information creates a poor user experience, consumes excessive computing resources (e.g., processing resources and memory resources) that are needed for a client device to generate and display the web pages and that are needed for one or more server devices to serve the web pages to the client device, and consumes excessive network resources that are needed for communications between the client device and the server device. Some implementations described herein enable relevant information from multiple entities to be presented via a web page without requiring a user to navigate through a large number of web pages and/or input personal information about the user via multiple web pages for different entities. For example, delivery data (e.g., estimated delivery dates) for multiple merchants can be presented via a web page without navigating through web pages for all of the merchants.

To enable delivery data for multiple merchants to be presented without excessive web page navigation, some systems described herein parse emails, perform web crawling, and/or extract data from web pages presented for display to obtain delivery data for multiple merchants and populate a database with accurate delivery data. Furthermore, some systems described herein use machine learning to obtain accurate estimates of the delivery data used to populate the database. Some systems described herein are capable of detecting when to present unified delivery data for multiple merchants, thereby reducing excessive processing of the delivery data and conserving network resources by reducing a volume of requests for the delivery data. After the delivery data is obtained, some implementations described herein enable the delivery data for multiple merchants to be easily viewed by using a web browser extension to insert code into a document object model of a web page to make the delivery data easier to access using a client device (e.g., by eliminating excessive web page navigation using the client device).

As indicated above, the systems described herein can conserve processing resources, memory resources, and network resources. Furthermore, the systems described herein make data easier to access by enhancing a user interface, thereby improving a user experience, enhancing user-friendliness of a client device and the user interface, and improving the ability of a user to use the client device. In some implementations, delivery data is presented in a unified manner via a user interface (as opposed to a scenario where delivery data is presented on separate web pages of different merchants), thereby further improving access to the delivery data. Additionally, the systems described herein can improve data security by reducing a quantity of times that a client device transmits personal information of a user via a network. Additional details and advantages are described below.

FIGS. 1A-1E are diagrams of an example 100 associated with inserting code into a document object model of a graphical user interface for unified presentation of data. As shown in FIGS. 1A-1E, example 100 includes one or more data sources, a delivery data storage device, a data mining device, and a client device, which may execute a web browser and a browser extension. These devices and components are described in more detail in connection with FIG. 3.

As shown in FIG. 1A, and by reference number 102, a delivery data storage device may receive delivery data from one or more data sources. For example, the delivery data storage device may receive delivery data from a merchant server associated with a merchant and/or from a third party server associated with a third party that aggregates delivery data for a merchant or for multiple merchants. Additionally, or alternatively, the delivery data storage device may receive delivery data from and/or may generate delivery data based on information received from an email server (e.g., using email parsing), one or more web servers (e.g., using web crawling), and/or one or more client devices (e.g., by extracting data from web pages). Additional details associated with populating a data structure that stores delivery data are described below in connection with FIG. 1B.

As shown by reference number 104, the delivery data storage device may store delivery data in a data structure, such as a database. As shown, the delivery data may identify an entity (referred to as a "merchant" in example 100), an item offered for sale or delivery by the entity (referred to as a "product" in example 100), a shipping option available for the item, one or more zip codes, and/or a delivery estimate associated with the entity, the item, the shipping option, and the one or more zip codes. The delivery estimate may be an estimated length of time (e.g., a number of days or a range of a number of days) for delivery, using a particular shipping option, of a product by a merchant to a zip code. As shown, one or more entries in the database may be identified using an identifier, such as a merchant identifier (or entity identifier) that identifies a merchant, or a product identifier that identifies a product. In example 100, zip codes are provided as an example geographic location for estimating deliveries, but other types of geographic locations may be used, such as a city, a state, a province, or another geographic region. As used herein, a product may refer to a specific product (e.g., a specific brand, size, and count of toilet paper that can be purchased) or to a category or type of product (e.g., generic toilet paper).

As an example, Merchant A may offer Product X for sale, and may offer multiple shipping options for shipping Product X, shown as a Standard (e.g., slower) option and an Expedited (e.g., faster) option. In example 100, Merchant A is estimated to deliver Product X to a zip code included in a first set of zip codes (shown as "00000, 00001, . . . ") in 3-5 days using a standard shipping option, and is estimated to deliver Product X to a zip code included in a second set of zip codes (shown as "99999, 99998, . . . ") in 4-6 days using the standard shipping option. As further shown, Merchant A is estimated to deliver Product X to a zip code included in the first set of zip codes in 2 days using an expedited shipping option, and is estimated to deliver Product X to a zip code included in the second set of zip codes in 3 days using the expedited shipping option. Other examples are shown and are used below to assist with explaining implementations described herein.

In some implementations, different merchants identified in the data structure are associated with different merchant platforms (e.g., websites, domain names, and/or applications) that enable purchase of a product from those merchants. For example, a first merchant identified in the data structure may be associated with a first merchant platform (e.g., website, domain name, or application) that does not enable purchase of a product from a second merchant identified in the data structure. Similarly, the second merchant may be associated with a second merchant platform that does not enable purchase of a product from the first merchant. Because merchants for which delivery data is included in the data structure may be associated with different merchant platforms, populating the data structure is more difficult than if all of the merchants were associated with the same merchant platform that enables purchases from multiple merchants. Details of how the data structure can be populated are described in connection with FIG. 1B.

Figure 1B:
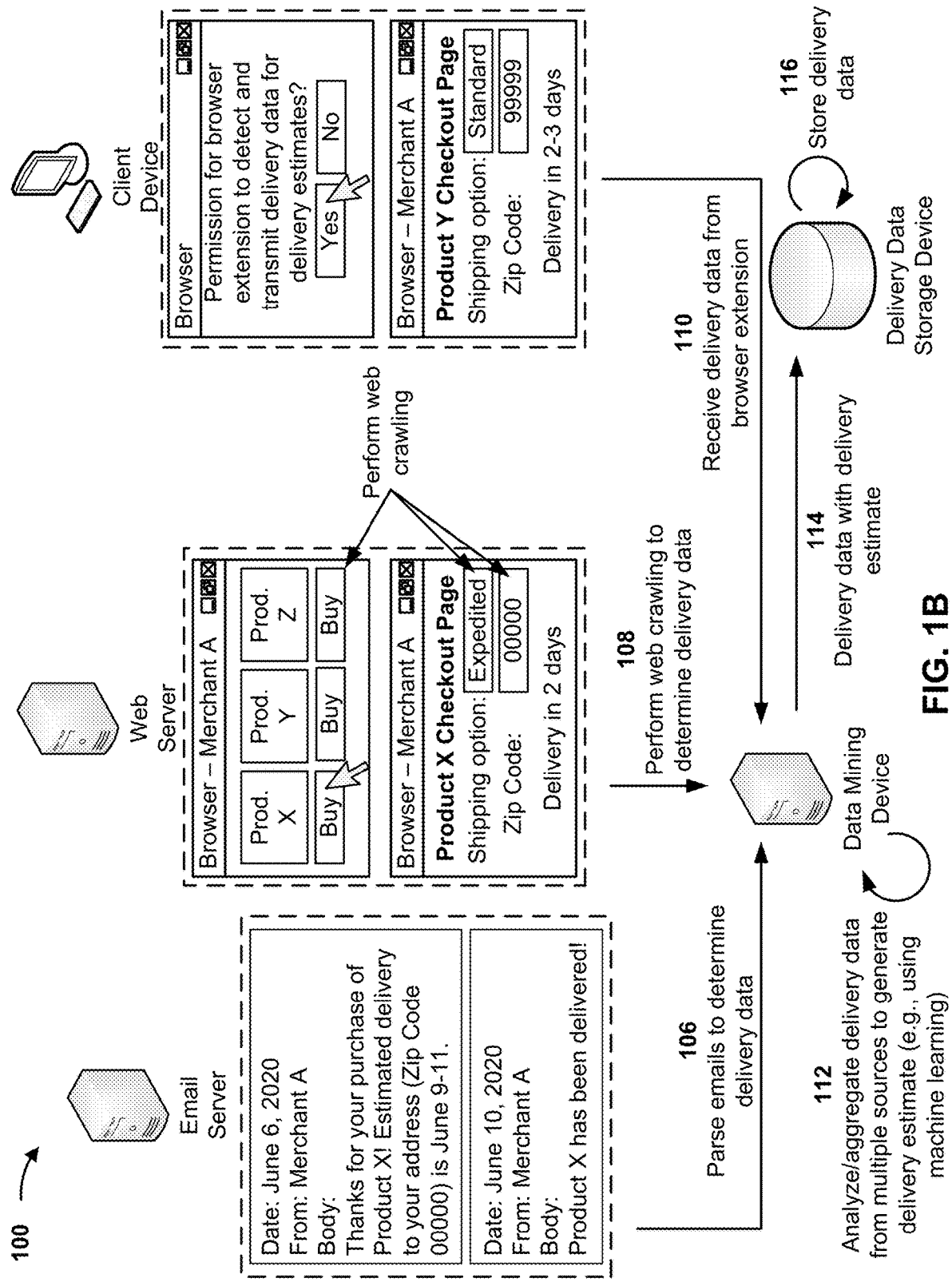

As shown in FIG. 1B, the delivery data storage device and/or a data mining device may populate the data structure that stores delivery data by using one or more computer-implemented techniques, such as email parsing, web crawling, extraction of data from a web page, and/or machine learning. In some implementations, the delivery data storage device and/or the data mining device may use a combination of these techniques to populate different entries of the data structure and/or to improve the accuracy of a particular entry of the data structure. These techniques and/or combinations of techniques enable improved accuracy of delivery data as compared to other techniques, such as obtaining generic data regarding delivery estimates associated with merchants. For example, a merchant web page may indicate a generic delivery estimate of 3-6 days across a wide variety of products. Rather than applying this generic delivery estimate to all products sold by the merchant, one or more techniques described herein may be used to obtain more accurate delivery estimates, which may be specific to a product, a shipping option, and/or a geographic location.

As shown by reference number 106, the data mining device (and/or the delivery data storage device) may use an email parsing technique to obtain accurate delivery data. For example, a data mining device may receive email content (e.g., information included in one or more emails) from one or more email servers, and may analyze the email content to obtain accurate delivery data. For example, the data mining device may search a set of emails to identify one or more emails from a merchant (e.g., emails with a sender that matches a stored email address associated with the merchant and/or emails that include one or more keywords associated with a merchant, such as a merchant name). In some implementations, the data mining device may identify a product based on an email, such as by identifying a product name in the email (which may be a product name included in stored delivery data, or may be a new product name not stored in the delivery data) or looking up a product based on an order number included in the email, among other examples. The data mining device may determine a geographic location for delivery of the product based on information included in the email (e.g., a shipping address) or based on stored information associated with a user who opts in to email parsing in return for receiving accurate delivery estimates (e.g., a user who opts in to using a browser extension, as described in more detail elsewhere herein). The data mining device may determine a shipping option used for delivery of the product based on information included in the email (e.g., identification of a shipping option or a shipping cost) or by looking up a shipping option based on an order number included in the email, among other examples.

The data mining device may determine a delivery estimate for a merchant and/or a product by parsing an order confirmation email to identify an estimated delivery date (e.g., using information included in the email, and/or a date stamp or time stamp that indicates when an email was transmitted or received). Additionally, or alternatively, the data mining device may determine a delivery estimate for a merchant and/or a product by parsing a shipping confirmation email to identify an estimated delivery date. Additionally, or alternatively, the data mining device may determine a delivery estimate for a merchant and/or a product by parsing a delivery confirmation email to identify an actual delivery date. The data mining device may apply different weights to estimated delivery dates based on the type of email. For example, an actual delivery date included in a delivery confirmation email may override and/or receive a stronger weight than an estimated delivery date included in an order confirmation email and/or a shipping confirmation email. As another example, an estimated delivery date included in a shipping confirmation email may override and/or receive a stronger weight than an estimated delivery date included in an order confirmation email.

For example, FIG. 1B shows an order confirmation email that has a date stamp of June 6 and that indicates an estimated delivery of June 9-11. Based on this email, the data mining device may determine an estimated delivery of 3-5 days for a corresponding merchant, product, zip code, and/or shipping option. FIG. 1B also shows a delivery confirmation email that has a date stamp of June 10 and indicates that the product has been delivered (on June 10). Based on this email, the data mining device may determine an estimated delivery of 2 days for a corresponding merchant, product, zip code, and/or shipping option. In some implementations, the data mining device may use delivery data from multiple emails (e.g., for the same order, which is associated with the same merchant, product, shipping option, and geographic location) to estimate delivery data to be stored by the delivery data storage device. Additionally, or alternatively, the data mining device may use the delivery data from multiple emails to train a machine learning model (e.g., by applying different weights to delivery data determined from different types of emails), which may later be used to estimate delivery data. In this way, the data mining device may increase the accuracy of delivery date estimates.

As shown by reference number 108, the data mining device (and/or the delivery data storage device) may use a web crawling technique to obtain accurate delivery data. For example, a data mining device may interact with one or more web servers to initiate a purchase process associated with a particular merchant, product, shipping option, and/or geographic location. Initiating the purchase process may include, for example, autonomously navigating to a web page associated with a merchant, selecting a product, navigating to a checkout web page associated with purchase of the product, inputting parameters that impact a delivery speed and/or delivery date of the product (e.g., a shipping option and/or a geographic location), and/or extracting a delivery estimate presented by a web page after inputting the parameters. In this case, the delivery estimate corresponds to a merchant, a product, a shipping option, and/or a geographic location, and the data mining device may provide this delivery data to the delivery data storage device for populating a data structure and/or may provide this information as input to train a machine learning model, as described in more detail elsewhere herein.

As an example, in FIG. 1B, the data mining device navigates to a web page of "Merchant A" and selects an input mechanism to purchase "Product X." The data mining device then inputs a shipping option of "Expedited" and a zip code of "00000," and the web page outputs delivery data that indicates delivery in 2 days. The data mining device may identify this delivery data from the web page, a document used to generate the web page (e.g., a document object model (DOM) and/or a hypertext markup language (HTML) document), and/or a uniform resource locator (URL) of the web page, such as by parsing the web page, DOM, or URL for keywords, by extracting information from a particular field, information element, or portion of the web page, DOM, or URL, and/or identifying the delivery data based on a URL of the web page (e.g., by looking up a merchant, product, or other delivery data stored in a data structure in association with the URL), among other examples. The delivery data may identify Merchant A, Product X, an expedited shipping option, a zip code of 0000, and a delivery estimate of 2 days. The data mining device may initiate hundreds, thousands, millions, or more purchase processes to gather data for hundreds, thousands, millions, or more combinations of merchant, product, shipping option, and/or geographic location. In this way, the data mining device may assist with populating a comprehensive database that stores accurate delivery data.

As shown by reference number 110, the data mining device (and/or the delivery data storage device) may receive accurate delivery data from a client device that extracts delivery data from one or more web pages presented for display. For example, a user of the client device may install a browser extension and provide input to give the browser extension permission to detect web pages that include delivery estimates. The browser extension may detect a web page that includes delivery data, such as by determining that a URL, or a portion of a URL, matches a URL stored (e.g., cached) by the browser extension or satisfies a condition stored by the browser extension, or by determining that the web page or a document used to generate the web page (e.g., a DOM) includes one or more keywords (e.g., "delivery," "delivery date," "days," or "checkout").

As an example, in FIG. 1B, the user has interacted with the client device to initiate a purchase process associated with a particular merchant, product, shipping option, and geographic location. In this example, the user has provided input to navigate to a web page associated with a merchant (shown as "Merchant A"), select a product (shown as "Product Y"), navigate to a checkout web page associated with purchase of the product, and input parameters that impact a delivery speed of the product (shown as a shipping option of "Standard" and a zip code of "99999"). After inputting the parameters, the web page presents information indicating delivery of the product in 2-3 days. The browser extension may extract delivery data presented by the web page (or included in a DOM used to generate the web page), such as by parsing the web page, DOM, or URL for keywords, extracting information from a particular field or information element of the web page or DOM, and/or identifying the delivery data based on a URL of the web page, among other examples. The delivery data may identify Merchant A, Product Y, a standard shipping option, a zip code of 0000, and a delivery estimate of 2-3 days.

The browser extension may transmit the delivery data to the data mining device. The data mining device may obtain delivery data from hundreds, thousands, millions, or more purchase processes associated with multiple users and client devices to gather data for hundreds, thousands, millions, or more combinations of merchant, product, shipping option, and/or geographic location. In this way, the data mining device may assist with populating a comprehensive database that stores accurate delivery data. For example, the data mining device may provide the delivery data to the delivery data storage device for populating a data structure and/or may provide the delivery data as input to train a machine learning model, as described in more detail elsewhere herein.

As shown by reference number 112, in some implementations, the data mining device may analyze and/or aggregate delivery data from multiple sources to generate a delivery estimate that may be more accurate than a delivery estimate generated from a single source. In some cases, a first technique for obtaining delivery data may be associated with a more accurate delivery estimate than a second technique for obtaining delivery data. For example, parsing a delivery confirmation email that is generated based on actual delivery of a product may result in a more accurate delivery estimate than other techniques. As another example, the techniques shown in FIG. 1B that obtain delivery estimates specific to a product, shipping option, and/or geographic location (e.g., email parsing, web crawling, and extraction of delivery data by a browser extension) may be more accurate than other techniques that are not specific to a product, shipping option, and/or geographic location, such as techniques that determine a generic delivery estimate for a merchant (e.g., across all products and/or geographic locations).

If the data mining device obtains delivery data using multiple techniques, then the data mining device may store information that identifies an association between the delivery data and a technique used to obtain the delivery data (or a weight associated with the technique). The data mining device may apply different weights to delivery data obtained using different techniques to generate a delivery estimate with improved accuracy, and may provide that delivery estimate (with corresponding delivery data) to the delivery data storage device for storage. In some implementations, the data mining device may provide delivery data obtained using multiple techniques as input to a trained machine learning model, may execute the trained machine learning model using the input, and may receive output from the trained machine learning model that indicates a delivery estimate, thereby improving the accuracy of the delivery estimate.

As shown by reference number 114, the data mining device may transmit delivery data, including a delivery estimate, to the delivery data storage device. Although shown as separate devices, the data mining device and the delivery data storage device may be integrated into a single device. Additionally, or alternatively, the delivery data storage device may perform the techniques described herein as being performed by the data mining device.

As shown by reference number 116, the delivery data storage device may store the delivery data, such as using a data structure described above in connection with FIG. 1A. In some implementations, the data mining device may store a database of delivery data and corresponding techniques used to obtain the delivery data, which may indicate different delivery estimates (for different techniques) for the same combination of merchant, product, shipping option, and/or geographic location. The delivery data storage device may store a database that indicates a single delivery estimate for a particular combination of merchant, product, shipping option, and/or geographic location. As a result, the database stored by the delivery data storage device may be used to provide accurate delivery estimates based on requests from a browser extension (as described in more detail below), while the data mining device may retain information that enables the delivery estimates to be updated to become more accurate over time as additional delivery data is obtained.

Figure 1C:
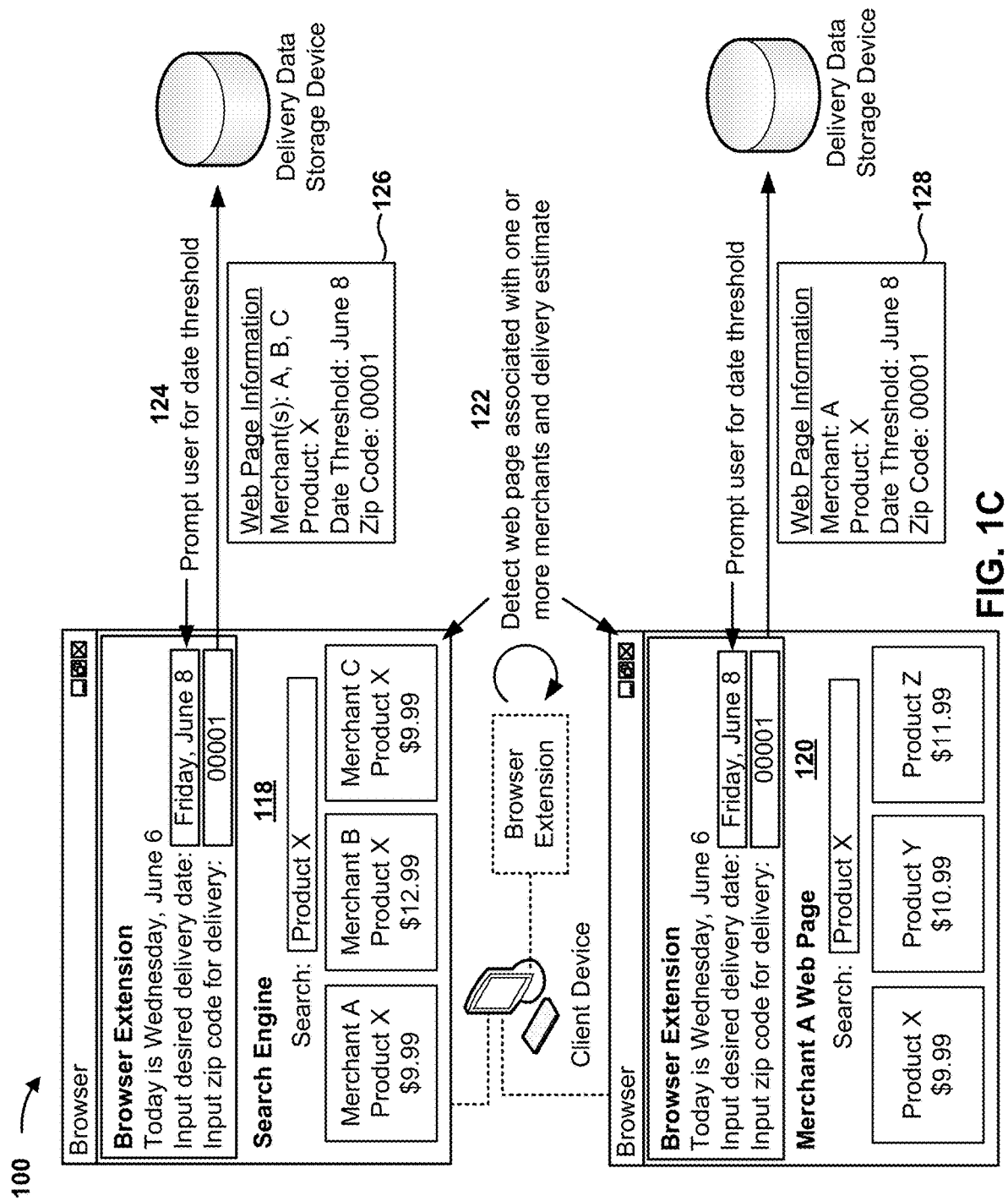

As shown in FIG. 1C, after the delivery data storage device has been populated with delivery data, a user may interact with a client device, that executes a web browser and a browser extension, to search for a product. For example, as shown by reference number 118, the client device may receive user input to navigate to a search engine web page and search for a product (e.g., based on user input of a product name, shown as "Product X"). The search engine web page may present product information, associated with the product, for one or more merchants. In some implementations, the search engine web page may present product information that identifies a product (e.g., a name of a product) offered for sale by multiple merchants. In some implementations, the product information may indicate a price of the product for one or more of the merchants.

As another example, and as shown by reference number 120, the client device may receive user input to navigate to a merchant web page and search for a product. In this example, the web page may have a domain name associated with the merchant. In some implementations, the client device or a server in communication with the client device may store information that identifies associations between merchants and domain names, which may be used to detect the merchant web page and/or trigger determination and presentation of a delivery estimate.

As shown by reference number 122, the client device (e.g., using the browser extension) may detect that a user interface (e.g., a web page), to be provided for presentation by the client device (e.g., in a web browser), is associated with an entity (e.g., a merchant) that is associated with one or more delivery estimates to be provided for presentation. For example, the client device may detect a web page that presents product information (e.g., a product name and/or a product price) for one or more merchants. Detection of the web page may trigger determination and/or presentation of the one or more delivery estimates, as described in more detail below. Although some techniques are described herein in connection with web pages, one or more techniques described herein may be used in connection with other types of user interfaces, such as a user interface associated with an application other than a web browser.

In some implementations (e.g., in the search engine web page scenario), the client device may determine that the web page, a DOM used to generate the web page, and/or a URL associated with the web page includes information that identifies a merchant and/or a product offered for sale by the merchant, such as a merchant name and/or a product name, among other examples. For example, the client device may identify the merchant and/or the product by searching the web page, the DOM, and/or the URL for one or more keywords (e.g., one or more merchant names or product names) stored by the client device and/or a server in communication with the client device. Additionally, or alternatively, the client device may determine that a particular field of the web page or DOM (e.g., a search field) includes information that identifies the merchant and/or the product. Additionally, or alternatively, the client device may determine that the web page displays price information (e.g., by searching for a particular character, string of characters, or pattern of characters). Additionally, or alternatively (e.g., in the merchant web page scenario), the client device may determine that a URL or a portion of the URL includes a string that matches a stored string associated with a merchant. Based on determining that the web page, DOM, and/or URL includes information that identifies a merchant and/or a product (e.g., using one or more of the techniques described above), the client device may trigger determination and/or presentation of one or more delivery estimates.

As shown by reference number 124, the client device (e.g., using the browser extension) may prompt a user to input a date threshold, such as by presenting an input mechanism (e.g., a text box, a date selection input mechanism, or a calendar input mechanism) that enables the user to input a date. The date threshold may indicate a required or desired delivery date by which the user wants to receive the product. In some implementations, the client device may prompt the user to input the data threshold based on the client device detecting a web page that provides product information for one or more merchants, as described above. In some implementations, the client device may prompt the user to input a geographic location, such as a zip code, and/or a preferred shipping option, in a similar manner as described above. Alternatively, the client device (e.g., the browser extension) may store information that identifies a default date threshold (e.g., a preference of the user for product delivery in 3 days or less), a default zip code (e.g., a zip code associated with the user's home address), and/or a default shipping option (e.g., standard shipping) based on prior information input by the user. The client device may use a default value (e.g., for the date threshold, the geographic location, and/or the shipping option) instead of prompting the user to input a value, or may auto-fill one or more input mechanisms with a default value and allow the user to edit the default value.

As shown by reference number 126, the client device may transmit, to the delivery data storage device, user interface information (e.g., web page information) to be used to determine one or more delivery estimates. The user interface information may identify one or more merchants, such as one or more merchants identified on the web page. Additionally, or alternatively, the user interface information may identify one or more products (e.g., one or more products identified on the web page), the date threshold, the geographic location, and/or the preferred shipping option. In example 100 of FIG. 1C, the browser extension has extracted a product name of "Product X" from the web page, has extracted merchant names of "Merchant A," Merchant B," and "Merchant C" from the web page, and has received user input indicating a date threshold of "June 8" (e.g., 2 days from a current date of June 6) and a zip code of "00001." As shown, the client device transmits this web page information to the delivery data storage device. In this example, the web page information identifies multiple merchants.

As shown by reference number 128, in a different example, the web page information may identify a single merchant rather than multiple merchants, such as when the detected web page is a web page associated with a particular merchant rather than a search engine web page that presents product information for multiple merchants. Alternatively, the client device may identify one or more additional merchants based on the particular merchant associated with the presented web page (e.g., one or more additional merchants that are competitors of the particular merchant and/or that offer some of the same products as the particular merchant), and may transmit web page information that identifies the particular merchant and the one or more additional merchants. In some implementations, the client device (e.g., the browser extension) may store a data structure that indicates associations between merchants, which may be used to look up the one or more additional merchants based on the particular merchant associated with the web page.

Figure 1D:
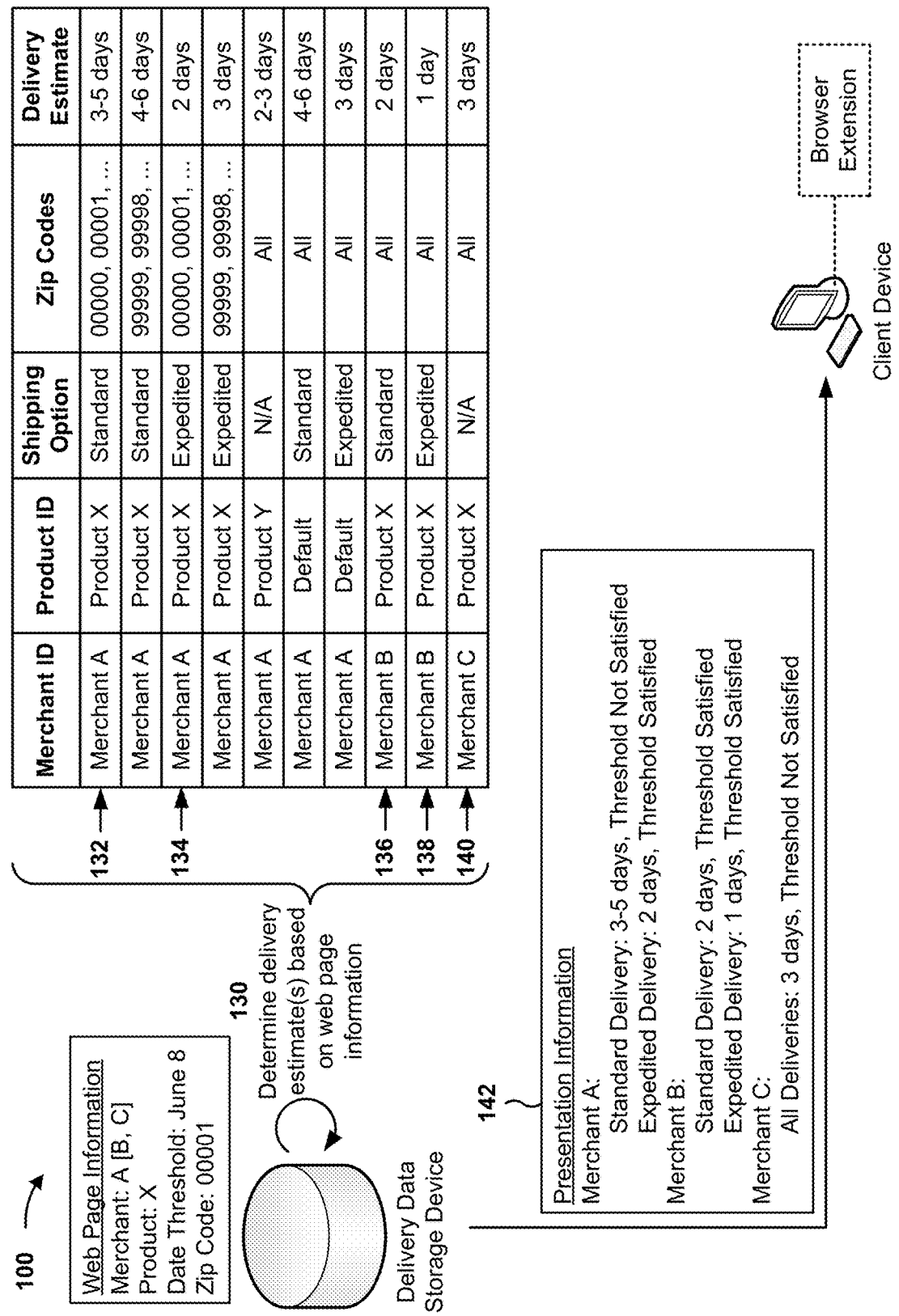

As shown in FIG. 1D, and by reference number 130, the delivery data storage device may determine one or more delivery estimates based on the web page information. As shown, the delivery data storage device may use the data structure described above in connection with FIG. 1A (and populated as described above in connection with FIG. 1B) to determine the one or more delivery estimates. For example, when the web page information identifies a product, a geographic location, and multiple merchants, the delivery data storage device may look up a delivery estimate for that product and a geographic location for each merchant identified in the web page information. In some implementations, the delivery data storage device may identify multiple delivery estimates for a particular merchant, product, and geographic location, such as when the merchant offers multiple shipping options. In some implementations, the delivery estimate identified by the delivery data storage device may depend on a time of day when the web page information is received.

In example 100 of FIG. 1D, if the web page information identifies Merchant A, Merchant B, Merchant C, Product X, and a zip code of 00001, then the delivery data storage device may identify a first delivery estimate 132 of 3-5 days for Merchant A, Product X, a standard shipping option, and the zip code of 00001, may identify a second delivery estimate 134 of 2 days for Merchant A, Product X, an expedited shipping option, and the zip code of 00001, may identify a third delivery estimate 136 of 2 days for Merchant B, Product X, a standard shipping option, and the zip code of 00001, may identify a fourth delivery estimate 138 of 1 day for Merchant B, Product X, an expedited shipping option, and the zip code of 00001, and may identify a fifth delivery estimate 140 of 3 days for Merchant C, Product X, a single shipping option of Merchant C (e.g., which does not offer multiple shipping options), and the zip code of 00001.

In some implementations, the web page information may identify a single merchant, such as in the merchant web page scenario described above in connection with FIG. 1C. In this case, the delivery data storage device may determine one or more delivery estimates for only the identified merchant, such as the first delivery estimate 132 and the second delivery estimate 134 where only Merchant A is identified in the web page information. Alternatively, the delivery data storage device may identify one or more additional merchants that offer the product, such as by looking up the product name (or other product identifier) in the data structure to identify one or more additional merchants associated with the product name. In example 100 of FIG. 1D, the delivery data storage device may identify the third delivery estimate 136, the fourth delivery estimate 138, and the fifth delivery estimate 140 based on Product X being identified in the web page information, because Merchant B and Merchant C are associated with Product X in the data structure. In some implementations, the web page information may include an indication of whether to provide delivery estimates for one or more additional merchants other than the one or more merchants identified in the web page information, and the delivery data storage device may determine delivery estimates based on that indication. For example, a user may provide input to the client device indicating whether to provide delivery estimates for one or more additional merchants (e.g., other than one or more merchants identified on a web page), and the client device may include the indication in the web page information based on the user input.

In some implementations, the delivery data storage device may determine whether the determined delivery estimate(s) satisfy the date threshold indicated in the web page information. The date threshold may be indicated as a threshold number of days (e.g., 2 days) or may be indicated as a threshold date (e.g., June 8). If the date threshold is indicated as a threshold date, then the delivery data storage device may determine a current date (e.g., based on an internal clock of the delivery data storage device) and may calculate a threshold number of days (e.g., 2 days) based on the current date (e.g., June 6) and the indicated date (e.g., June 8). The delivery data storage device may determine whether each identified delivery estimate satisfies the threshold number of days. For example, if the threshold number of days is 2 days, the delivery data storage device may determine, for each delivery estimate, whether that delivery estimate is less than or equal to 2 days. In example 100 of FIG. 1D, the delivery data storage device determines that the first delivery estimate 132 of 3-5 days does not satisfy the date threshold, determines that the second delivery estimate 134 of 2 days satisfies the date threshold, determines that the third delivery estimate 136 of 2 days satisfies the date threshold, determines that the fourth delivery estimate 138 of 1 day satisfies the date threshold, and determines that the fifth delivery estimate 140 of 3 days does not satisfy the date threshold.

As shown by reference number 142, the delivery data storage device may transmit presentation information to the client device. The presentation information may be used by the client device to present a user interface (e.g., a web page) for display. As shown, the presentation information may include a delivery estimate (e.g., 3-5 days) and/or an indication of whether the delivery estimate satisfies the date threshold (e.g., a Boolean value). As shown, the presentation information may include multiple delivery estimates, where each delivery estimate corresponds to a different merchant and/or a different shipping option for a merchant.

In some implementations, the presentation information may indicate only whether a merchant is capable of satisfying the date threshold (e.g., using one or more shipping options, which may be associated with different indications of whether the merchant is capable of satisfying the date threshold), and may not indicate the delivery estimate (e.g., the number of days or range of number of days). This conserves signaling overhead and network resources that would otherwise be used to indicate the delivery estimate. Alternatively, the presentation information may include both the delivery estimate and the indication of whether the merchant is capable of satisfying the date threshold, which enables the client device to present additional information to improve a user experience and avoid excess navigation among web pages.

In some implementations, the client device (e.g., the browser extension) may not transmit the date threshold to the delivery data storage device (e.g., in the web page information). In this case, the delivery data storage device may transmit a delivery estimate to the client device (e.g., in the presentation information), and the client device (e.g., the browser extension) may determine whether the delivery estimate satisfies the date threshold, in a similar manner as described above. Thus, the determination of whether the delivery estimate satisfies the threshold may be made by the delivery data storage device or the client device.

Figure 1E:
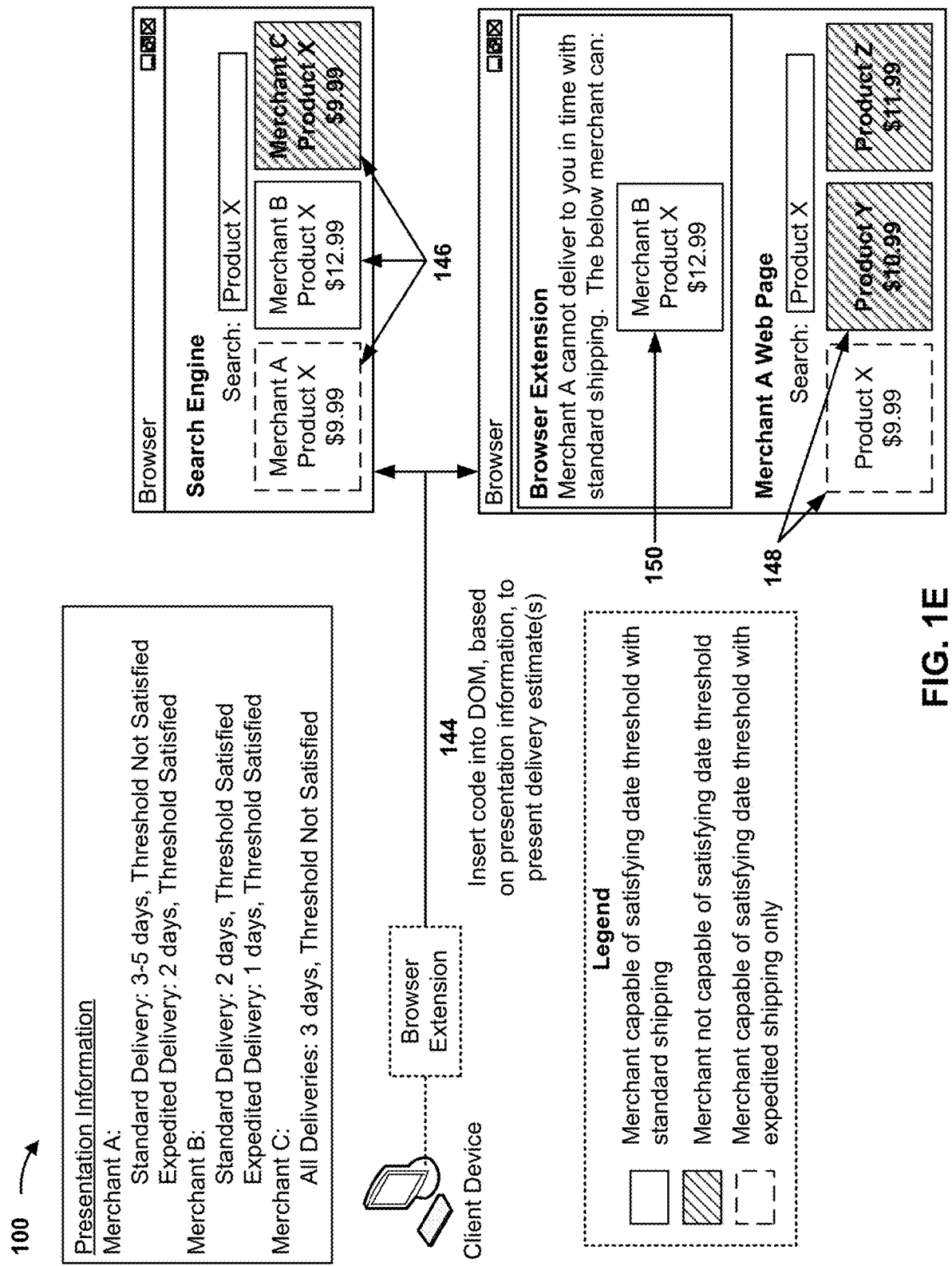

As shown in FIG. 1E, and by reference number 144, the client device may insert code into a document used to generate the web page (e.g., a DOM) based on the presentation information received from the delivery data storage device. The code may include HTML code, cascading style sheet (CSS) code, a script, or any other code capable of causing the web page to present information. After the code is inserted, the client device may provide the web page for presentation and/or may present the web page for display. Insertion of the code may cause the web page to be presented differently than if the web page were presented without the code.

As shown by reference number 146, in some implementations, the code may cause the web page to present an indication of whether the date threshold can be satisfied by one or more merchants. For example, for a web page that includes product information for multiple merchants (e.g., a search engine web page), the code may cause the web page to present an indication for each of the multiple merchants (e.g., if the presentation information includes a delivery estimate and/or an indication for all of the merchants) or for a subset of the multiple merchants (e.g., if the presentation information does not include a delivery estimate and/or an indication for all of the merchants). As shown, the code causes a first indication (shown as a dashed line box with a solid white fill pattern) to be presented in connection with Merchant A to indicate that Merchant A is capable of satisfying the date threshold using a first shipping option (e.g., expedited shipping) but not a second shipping option (e.g., standard shipping), causes a second indication (shown as a solid line box with a solid white fill pattern) to be presented in connection with Merchant B to indicate that Merchant B is capable of satisfying the date threshold using all shipping options and/or a default shipping option (e.g., standard shipping), and causes a third indication (shown as solid line box with a diagonal line fill pattern) to be presented in connection with Merchant C to indicate that Merchant C is not capable of satisfying the date threshold (e.g., regardless of the shipping option used).

Although FIG. 1E shows indications being provided using an outline pattern and a fill pattern for a box around a merchant name and a product name of a product sold by the merchant, the client device may use other types of indications, such as different colors, different images, different icons, different fonts, and/or different sizes of displayed information, among other examples. For example, the client device may present an indication using a first color (e.g., green) to indicate that a merchant is capable of satisfying the date threshold, and may present information using a second color (e.g., red) to indicate that a merchant is not capable of satisfying the date threshold (e.g., using a particular shipping option or regardless of the shipping option). In some implementations, the client device may present an indication using a third color (e.g., yellow) to indicate that a merchant is capable of satisfying the date threshold using a first shipping option (e.g., expedited shipping) but not a second shipping option (e.g., standard shipping). Additionally, or alternatively, the client device may present an indication using a fourth color (e.g., orange) when the delivery estimate includes a range of dates (e.g., 2-3 days), at least one of the dates in the range (e.g., 2 days) satisfies the date threshold, and one or more other dates in the range (e.g., 3 days) do not satisfy the date threshold.

In some implementations, the code may cause information other than an indication of whether the delivery estimate satisfies the date threshold to be presented for display via the web page, in addition to or instead of the indication of whether the delivery estimate satisfies the date threshold. For example, the code may cause a delivery estimate (e.g., 2 days, 2-3 days) and/or information that identifies a shipping company to be presented for display in connection with a corresponding merchant. Additionally, or alternatively, the code may cause the web page to present a delivery estimate for another location other than the geographic location input by the user, such as a physical store (e.g., a merchant location). In some implementations, the browser extension may cause this code to be inserted only if the delivery estimate for the other location is faster than (e.g., fewer days than) a delivery estimate to the geographic location, and/or only if the other location is within a threshold proximity of the geographic location (e.g., within 10 miles, within 25 miles, or the like). The client device may receive the delivery estimate for the other location in a similar manner as described elsewhere herein.

Additionally, or alternatively, the code may cause one or more shipping costs (e.g., corresponding to one or more shipping options) to be presented for display in connection with a corresponding merchant. In some implementations, information that identifies a shipping cost may be part of the delivery data stored in the data structure described above in connection with FIG. 1A, and may be obtained to populate the data structure using one or more techniques described above in connection with FIG. 1B. In some implementations, if a merchant is capable of satisfying the date threshold using a first shipping option but not a second shipping option, the client device may insert code into the DOM to indicate a shipping cost for the first shipping option and/or to update the price of the product, displayed via the web page, to include the original price (that would have otherwise been displayed without insertion of the code) plus the shipping cost for the first shipping option.

As shown in FIG. 1E, the code may cause an indication for a merchant to be presented for display in connection with merchant information, that represents and/or is associated with the merchant, presented on the web page. The merchant information may include, for example, a merchant name, a merchant logo, a name of a product offered for sale by the merchant, an image of a product offered for sale by the merchant, and/or a price of the product offered for sale by the merchant. For example, the indication may be presented in close proximity to the merchant information, may be presented around the merchant information (e.g., as a box or other shape around the merchant information), and/or may be overlaid on top of the merchant information. In some implementations, the code may cause the indication to be presented in a separate frame or panel of the web page in connection with merchant information that identifies a merchant associated with the indication.

As shown by reference number 148, if a web page includes information for multiple products, then the code may cause corresponding indications to be presented for display for each of those products or for a subset of those products (e.g., a single product or multiple products). The client device may obtain indications for the multiple products based on detecting that the web page is to present information associated with the multiple products (e.g., in a similar manner as described above in connection with FIG. 1C) and by transmitting web page information, to the delivery data storage device, that identifies the multiple products (e.g., Product X, Product Y, and Product Z). The delivery data storage device may determine whether the date threshold can be satisfied for the products included in the web page information and may transmit, to the client device, presentation information for each of the multiple products, as described above in connection with FIG. 1D. As a result, a user can easily see which products, associated with a search, can be delivered to the user by a desired due date. This improves access to delivery data, conserves processing resources and network resources that would otherwise be consumed by individually determining whether the date threshold can be satisfied for each product (e.g., using a checkout process described elsewhere herein), improves user-friendliness of the client device and the user interface (e.g., by presenting data in a unified manner via a single user interface, as opposed to a scenario where delivery data is presented on separate web pages), and improves the ability of a user to use the client device, among other benefits.

In an example where the client device presents a web page for a first merchant (e.g., a web page having a domain name associated with the first merchant), shown in FIG. 1E as Merchant A, the client device may insert first code that causes presentation of one or more indications that indicate whether the first merchant is capable of satisfying the date threshold for a corresponding one or more products, as shown. As shown by reference number 150, in some implementations, the client device may insert second code that causes presentation of one or more indications of whether the date threshold can be satisfied by a corresponding one or more second merchants (shown as Merchant B) other than the first merchant (and/or that provides a link to navigate to a checkout page for a second merchant and the product). In some implementations, the client device may insert the second code only if the client device determines that the first merchant is not capable of satisfying the date threshold, or only if the client device determines that the first merchant is not capable of satisfying the date threshold using a first shipping option (e.g., standard shipping), or only if the client device determines that the first merchant is only capable of satisfying the date threshold using a second shipping option (e.g., expedited shipping). In this way, the user interface provides information to a user that allows the user to easily identify a merchant capable of satisfying a desired delivery date, without excessive web page navigation.

As indicated above, FIGS. 1A-1E are provided as an example. Other examples may differ from what is described with regard to FIGS. 1A-1E.

Figure 2:
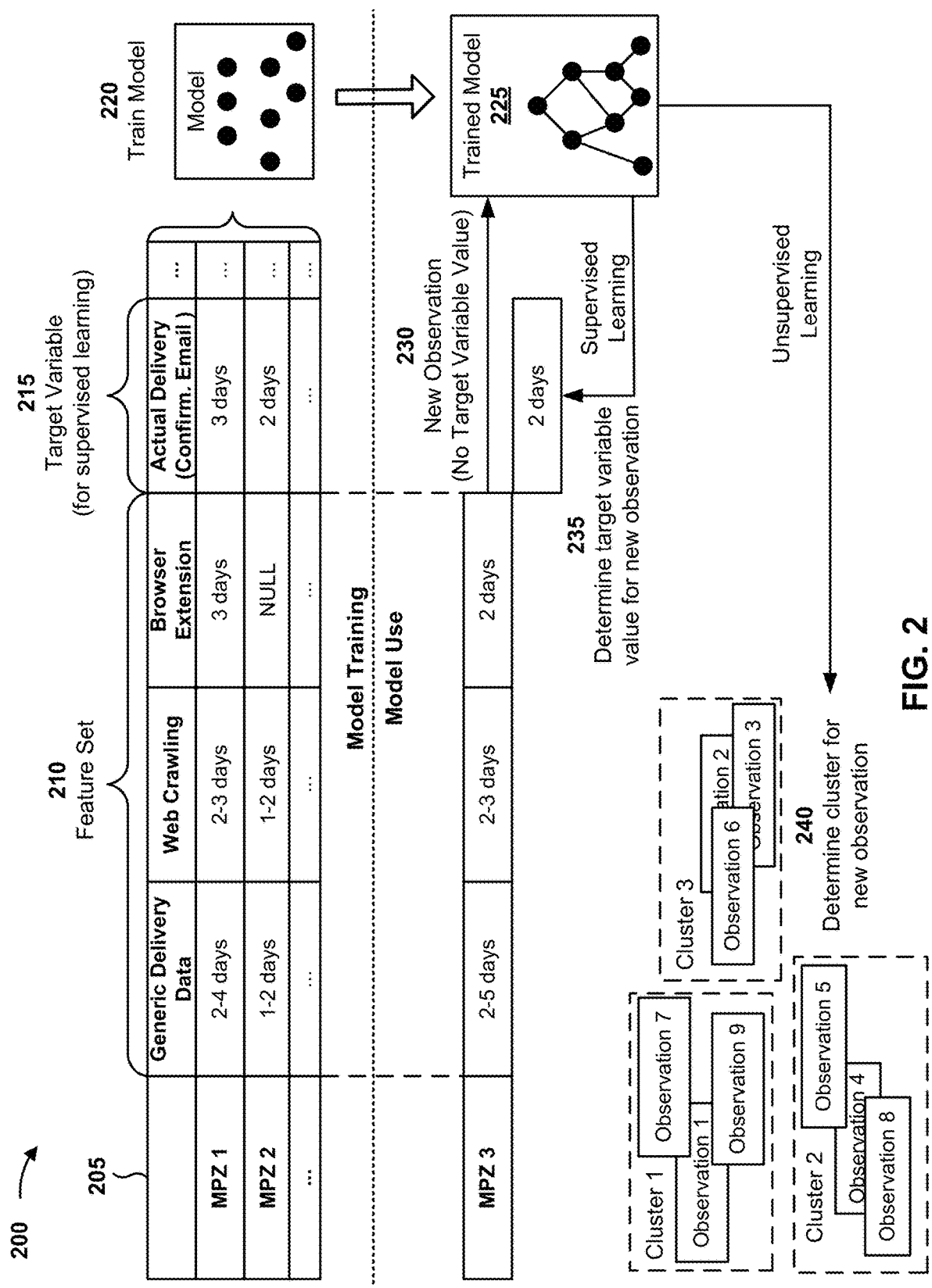
FIG. 2 is a diagram illustrating an example of training and using a machine learning model in connection with estimating data for unified presentation via a user interface.

FIG. 2 is a diagram illustrating an example 200 of training and using a machine learning model in connection with estimating delivery dates for unified presentation via a user interface, such as a web page. The machine learning model training and usage described herein may be performed using a machine learning system. The machine learning system may include or may be included in a computing device, a server, a cloud computing environment, or the like, such as the delivery data storage device 360 and/or the data mining device 370 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from one or more data sources, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from one or more data sources. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations (abbreviated MPZ to represent a combination of merchant, product, and zip code) may include a first feature of a delivery estimate determined based on generic delivery data provide via a merchant website, a second feature of a delivery estimate determined using a web crawling technique, a third feature of a delivery estimate determined using a browser extension, and so on. As shown, for a first combination of merchant, product, and zip code (shown as "MPZ 1"), the generic delivery data may indicate a delivery estimate of 2-4 days, the web crawling technique may indicate a delivery estimate of 2-3 days, the browser extension technique may indicate a delivery estimate of 3 days, and so on. These features and feature values are provided as examples, and may differ in other examples. For example, the feature set may include delivery estimates determined using any of the techniques described above in connection with FIG. 1B.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is an actual delivery date, which has a value of 3 days for the first observation. In some implementations, the value of the target variable may be determined based on email parsing that identifies the actual delivery speed (e.g., a number of days) based on a delivery confirmation email.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation (e.g., for "MPZ 3") may include a first feature from generic delivery data that indicates a delivery estimate of 2-5 days, a second feature from a web crawling technique that indicates a delivery estimate of 2-3 days, and a third feature from a browser extension technique that indicates a delivery estimate of 2 days. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of 2 days for the target variable of an actual delivery date for the new observation, as shown by reference number 235. Based on this prediction, the machine learning system may transmit, to the delivery data storage device, information that identifies the predicted value and the combination of merchant, product, and zip code (or other geographic location), for storage in the data structure described above in connection with FIG. 1A. In some implementations, an observation may include a different combination of elements than merchant, product, and geographic location, such as merchant, product, geographic location, and shipping option, or such as merchant, product, and shipping option.

In some implementations, the trained machine learning model 225 may classify (e.g., cluster) the new observation in a cluster, as shown by reference number 240. The observations within a cluster may have a threshold degree of similarity. For example, if one or more techniques indicate a corresponding one or more delivery estimates for the new observation (e.g., a first combination of two or more of a merchant, a product, a geographic location, or a shipping option), and the one or more techniques indicate the same or similar corresponding delivery estimates for one or more other observations (e.g., one or more other combinations), then the trained machine learning model 225 may include the new observation and the one or more other observations in the same cluster. The trained machine learning model 225 may use actual delivery estimates for the one or more other observations to predict an actual delivery estimate for the new observation.

In this way, the machine learning system may apply a rigorous and automated process to obtain accurate delivery estimates. The machine learning system enables recognition and/or identification of tens, hundreds, thousands, or millions of features and/or feature values for tens, hundreds, thousands, or millions of observations, thereby increasing accuracy and consistency and reducing delay associated with determining accurate delivery estimates relative to requiring computing resources to be allocated for tens, hundreds, or thousands of operators to manually determine accurate delivery dates using the features or feature values.

As indicated above, FIG. 2 is provided as an example. Other examples may differ from what is described in connection with FIG. 2.

Figure 3:
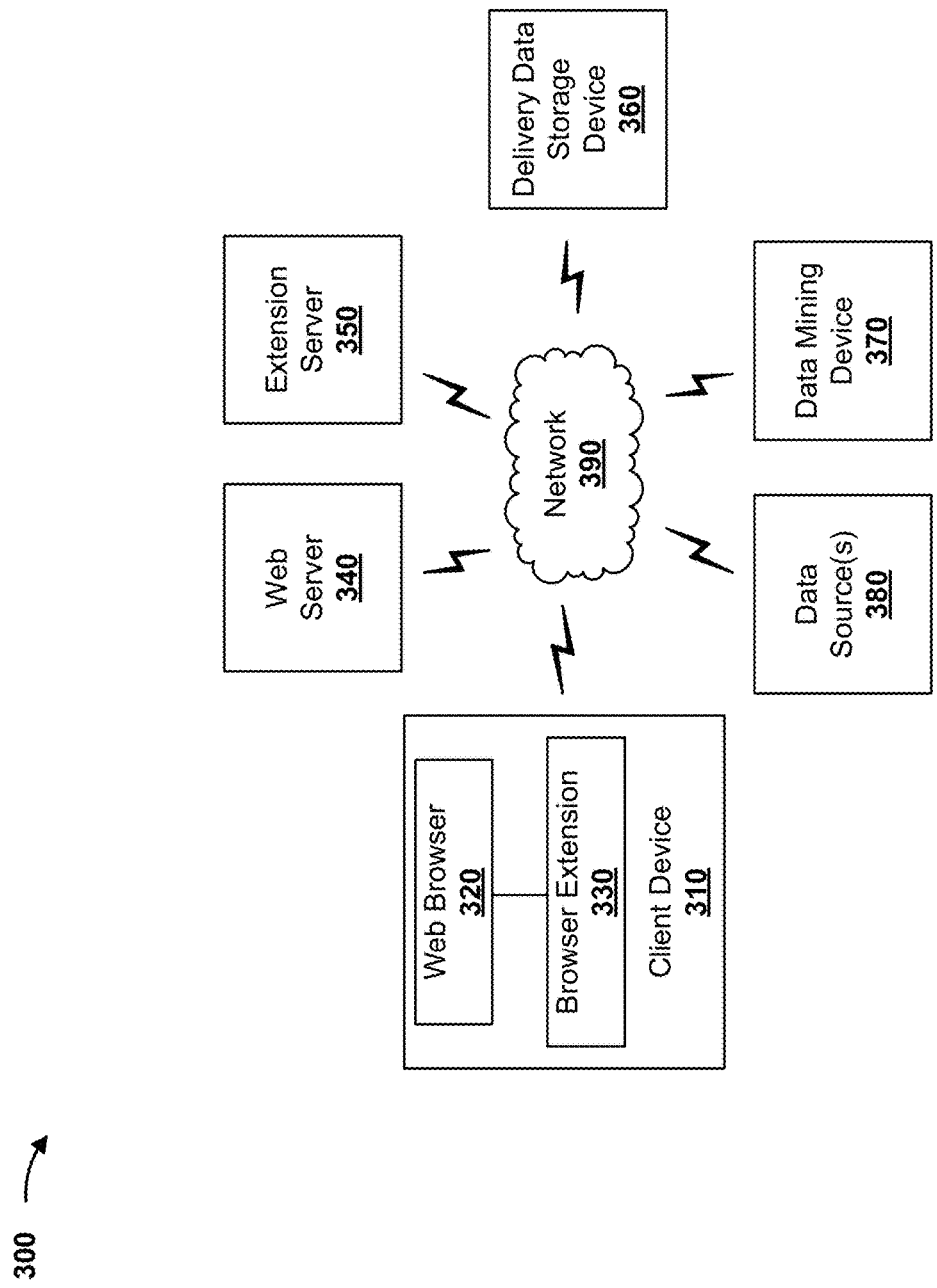
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a client device 310 (e.g., which may execute a web browser 320 and a browser extension 330), a web server 340, an extension server 350, a delivery data storage device 360, a data mining device 370, one or more data sources 380, and a network 390. Devices of environment 300 may interconnect via wired connections, wireless connections, or a combination of wired and wireless connections.

Client device 310 includes a device that supports web browsing. For example, client device 310 may include a computer (e.g., a desktop computer, a laptop computer, a tablet computer, a handheld computer, and/or the like), a mobile phone (e.g., a smart phone and/or the like), a television (e.g., a smart television), an interactive display screen, and/or a similar type of device. Client device 310 may host a web browser 320 and/or a browser extension 330 installed on and/or executing on the client device 310.

Web browser 320 includes an application, executing on client device 310, that supports web browsing. For example, web browser 320 may be used to access information on the World Wide Web, such as web pages, images, videos, and/or other web resources. Web browser 320 may access such web resources using a uniform resource identifier (URI), such as a uniform resource locator (URL) or a uniform resource name (URN). Web browser 320 may enable client device 310 to retrieve and present, for display, content of a web page.

Browser extension 330 includes an application, executing on client device 310, capable of extending or enhancing functionality of web browser 320. For example, browser extension 330 may be a plug-in application for web browser 320. Browser extension 330 may be capable of executing one or more scripts (e.g., code, which may be written in a scripting language, such as JavaScript and/or the like) to perform an operation in association with the web browser 320. As described elsewhere herein, browser extension 330 may be capable of identifying and/or extracting information from a web page. Additionally, or alternatively, browser extension 330 may be capable of inserting code into a document used to generate a web page. In some implementations, operations described herein as being performed by client device 310 may be performed by browser extension 330 and/or web browser 320, and vice versa.

Web server 340 includes a device capable of serving web content (e.g., web documents, HTML documents, web resources, images, style sheets, scripts, text, and/or the like). For example, web server 340 may include a server and/or computing resources of a server, which may be included in a data center, a cloud computing environment, and/or the like. Web server 340 may process incoming network requests (e.g., from client device 310) using HTTP and/or another protocol. Web server 340 may store, process, and/or deliver web pages to client device 310. In some implementations, communication between web server 340 and client device 310 may take place using HTTP.

Extension server 350 includes a device capable of communicating with client device 310 to support operations of browser extension 330. For example, extension server 350 may store and/or process information for use by browser extension 330. As an example, extension server 350 may store a list of domains applicable to a script to be executed by browser extension 330. In some implementations, client device 310 may obtain the list (e.g., periodically, based on a trigger, and/or the like), and may store a cached list locally on client device 310 for use by browser extension 330.

Delivery data storage device 360 and data mining device 370 include one or more devices capable of receiving, generating, storing, processing, and/or providing delivery data and/or a delivery estimate. Delivery data storage device 360 and/or data mining device 370 may include a communication device and/or a computing device. For example, delivery data storage device 360 and/or data mining device 370 may include a database, a server, or a device in a cloud computing system, among other examples. Delivery data storage device 360 and data mining device 370 may be implemented as a single device or separate devices in communication with one another.

Data source 380 includes one or more devices capable of receiving, generating, storing, processing, and/or providing delivery data or content from which delivery data can be determined, as described elsewhere herein. Data source 380 may include a communication device and/or a computing device. For example, data source 380 may include a database, a server (e.g., a web server, an email server, an application server, a merchant server, and/or a server in a cloud computing system), and/or a client device, among other examples.

Network 390 includes one or more wired and/or wireless networks. For example, network 390 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
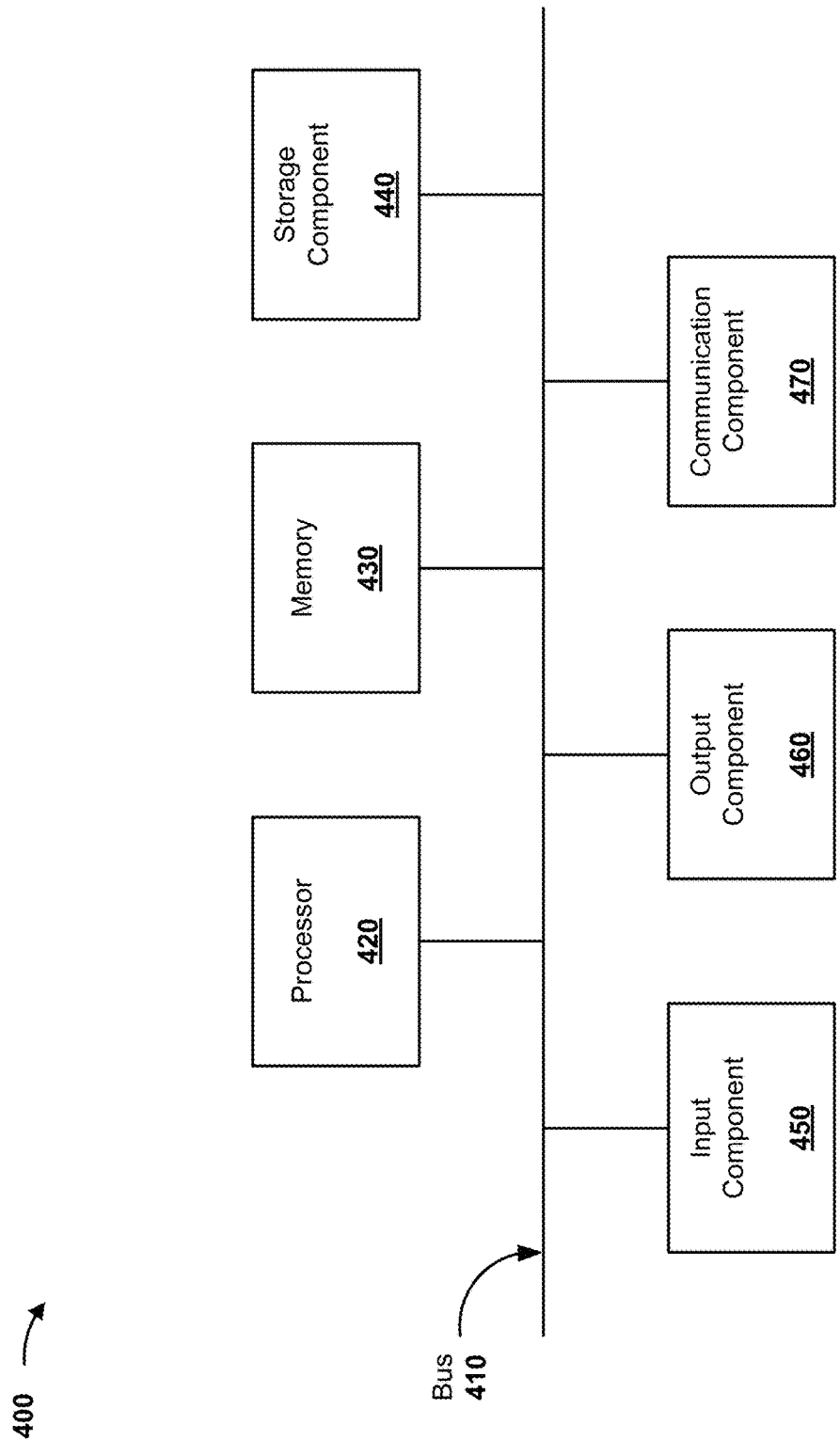
FIG. 4 is a diagram of example components of one or more devices of FIG. 3.

FIG. 4 is a diagram of example components of a device 400, which may correspond to client device 310, web server 340, extension server 350, delivery data storage device 360, data mining device 370, and/or data source 380. In some implementations, client device 310, web server 340, extension server 350, delivery data storage device 360, data mining device 370, and/or data source 380 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
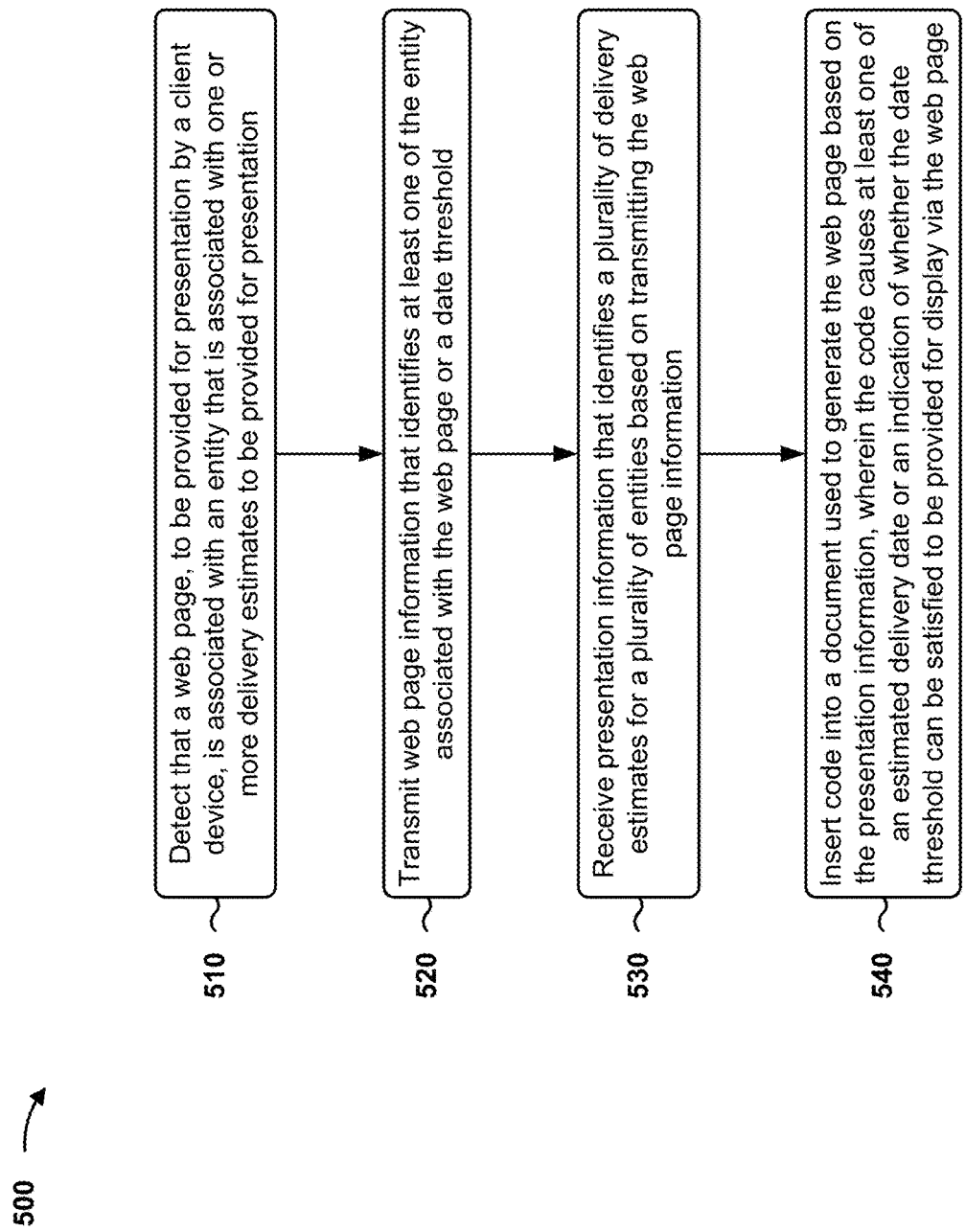
FIG. 5 is a flowchart of an example process relating to inserting code into a document object model of a graphical user interface for unified presentation of data.

FIG. 5 is a flowchart of an example process 500 associated with inserting code into a document object model of a graphical user interface for unified presentation of data. In some implementations, one or more process blocks of FIG. 5 may be performed by a client device (e.g., client device 310), a web browser executing on the client device (e.g., web browser 320), and/or a browser extension executing on the client device in connection with the web browser (e.g., browser extension 330). In some implementations, one or more process blocks of FIG. 5 may be performed by another device or a group of devices separate from or including the browser extension, such as web server 340, extension server 350, delivery data storage device 360, data mining device 370, and/or data source 380. Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include detecting that a web page, to be provided for presentation by a client device, is associated with an entity that is associated with one or more delivery estimates to be provided for presentation (block 510). As further shown in FIG. 5, process 500 may include transmitting web page information that identifies at least one of the entity associated with the web page or a date threshold (block 520). As further shown in FIG. 5, process 500 may include receiving presentation information that identifies a plurality of delivery estimates for a plurality of entities based on transmitting the web page information (block 530). As further shown in FIG. 5, process 500 may include inserting the code into a document used to generate the web page based on the presentation information (block 540). The code may cause at least one of an estimated delivery date or an indication of whether the date threshold can be satisfied to be provided for display via the web page.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions, the set of instructions comprising:
   one or more instructions that, when executed by one or more processors of a client device, cause the client device to:
      detect, before a presentation of an original version of a user interface via the client device and based on information associated with the original version of the user interface, that the user interface is associated with a single merchant and a first delivery of a product by the single merchant,
         wherein the single merchant is a first merchant associated with a first domain name;
      transmit, to a server and based on detecting that the user interface is associated with the single merchant and the product, user interface information that identifies the product and a delivery threshold,
         wherein the delivery threshold is associated with a user input that is provided to or stored by the client device;
      receive, from the server and based on transmitting the user interface information, presentation information that identifies:
         a first delivery estimate, associated with the first merchant, failing to satisfy the delivery threshold, and
         a second delivery estimate, associated with a second merchant associated with a second domain name, satisfying the delivery threshold;
      insert, based on the presentation information, code into a document object model of the user interface that causes a plurality of indications to be provided for presentation,
         wherein the plurality of indications includes:
            a first indication that the first merchant cannot satisfy the delivery threshold, and
            a second indication that the second merchant can satisfy the delivery threshold; and
      provide, before the presentation of the original version of the user interface and based on inserting the code into the document object model, a modified version of the user interface for presentation by the client device.

2. The non-transitory computer-readable medium of claim 1, wherein the one or more instructions further cause the client device to at least one of:
   determine that a uniform resource locator of the user interface includes a string that matches a stored string associated with the first merchant, or
   determine that the user interface includes information that identifies the first merchant and that the product is offered for sale by the first merchant.

3. A method, comprising:
   detecting, by a browser extension executing on a client device, before a presentation of an original version of a web page via a client device, that the web page is associated with a single merchant and a first delivery of a product by the single merchant,
      wherein the single merchant is a first merchant associated with a first domain name;
   transmitting, by the browser extension, to a server, and based on detecting that the web page is associated with the single merchant and the product, web page information that identifies the product and a delivery threshold,
wherein the delivery threshold is associated with a user input that is provided to or stored by the browser extension;
receiving, by the browser extension, from the server, and based on transmitting the web page information, presentation information that identifies:
a first delivery estimate, associated with the first merchant, failing to satisfy the delivery threshold, and
a second delivery estimate, associated with a second merchant associated with a second domain name, satisfying the delivery threshold; and
inserting, by the browser extension and based on the presentation information, code into a document, used to generate the web page that causes a plurality of indications to be provided for presentation,
wherein the plurality of indications includes:
a first indication that the first merchant cannot satisfy the delivery threshold, and
a second indication, that the second merchant can satisfy the delivery threshold.

4. The non-transitory computer-readable medium of claim 1, wherein the user interface includes a web page that presents information that identifies the product offered for sale by the first merchant.

5. The non-transitory computer-readable medium of claim 1, wherein the code further causes at least one of:
the first indication to be displayed using a first color, or
the second indication to be displayed using a second color.

6. The non-transitory computer-readable medium of claim 1, wherein the user interface includes a web page having the first domain name associated with the first merchant.

7. The non-transitory computer-readable medium of claim 1, wherein the one or more instructions, when executed by the one or more processors, further cause the client device to:
identify the product based on analyzing the document object model of the user interface,
wherein the user interface information is transmitted based on identifying the product.

8. The non-transitory computer-readable medium of claim 1, wherein the code causes only the first indication and the second indication to be presented.

9. The non-transitory computer-readable medium of claim 1, wherein the user interface information further identifies a geographic location, associated with the first delivery estimate and the second delivery estimate, based on the user input.

10. The method of claim 3, wherein the code further causes at least one of:
the first indication to be displayed in a first manner, or
the second indication to be displayed in a second manner.

11. The method of claim 3, further comprising:
identifying the product based on analyzing the document used to generate the web page,
the web page information is transmitted based on identifying the product.

12. The method of claim 3, wherein the web page information further identifies a geographic location, associated with the first delivery estimate and the second delivery estimate, based on the user input.

13. The method of claim 3, wherein the code causes only the first indication and the second indication to be presented.

14. A client device, comprising:
one or more memories; and
one or more processors, coupled to the one or more memories, configured to:
detect, before a presentation of an original version of a user interface via the client device and based on information associated with the original version of the user interface, that the user interface is associated with a single merchant and a first delivery of a product by the single merchant,
wherein the single merchant is a first merchant associated with a first domain name;
transmit, to a server and based on detecting that the user interface is associated with the single merchant and the product, user interface information that identifies the product and a delivery threshold,
wherein the delivery threshold is associated with a user input that is provided to or stored by the client device;
receive, from the server and based on transmitting the user interface information, presentation information that identifies:
a first delivery estimate, associated with the first merchant, failing to satisfy the delivery threshold, and
a second delivery estimate associated with a second merchant associated with a second domain name, satisfying the delivery threshold; and
insert, based on the presentation information, code into a document, used to generate the user interface, that causes a plurality of indications to be provided for presentation,
wherein the plurality of indications includes:
a first indication that the first merchant cannot satisfy the delivery threshold, and
a second indication that the second merchant can satisfy the delivery threshold.

15. The client device of claim 14, wherein detecting that the user interface is associated with the single merchant and the product comprises:
determining that a uniform resource locator of the user interface includes a string that matches a stored string associated with the first merchant, or
determining that the user interface includes information that identifies the first merchant and the product offered for sale by the first merchant.

16. The client device of claim 14, wherein the user interface includes a web page that presents information that identifies the product offered for sale by the first merchant.

17. The client device of claim 14, wherein the user interface information further identifies a geographic location associated with the first delivery estimate and the second delivery estimate, based on the user input.

18. The client device of claim 14, wherein the one or more processors are further configured to:
identify the product based on the document used to generate the user interface,
wherein the user interface information is based on identifying the product.

19. The client device of claim 14, wherein the code further causes at least one of:
the first indication to be displayed in a first manner, or
the second indication to be displayed in a second manner.

20. The client device of claim 14, wherein the code causes only the first indication and the second indication to be presented.

* * * * *